(12) United States Patent
Tuzhilin

(10) Patent No.: US 6,236,978 B1
(45) Date of Patent: May 22, 2001

(54) SYSTEM AND METHOD FOR DYNAMIC PROFILING OF USERS IN ONE-TO-ONE APPLICATIONS

(75) Inventor: Alexander S. Tuzhilin, New York, NY (US)

(73) Assignee: New York University, New York, NY (US)

(*) Notice: Subject to any disclaimer, the term of this patent is extended or adjusted under 35 U.S.C. 154(b) by 0 days.

(21) Appl. No.: 08/970,359

(22) Filed: Nov. 14, 1997

(51) Int. Cl.[7] ....................................................... G06F 17/60
(52) U.S. Cl. .................................. 705/26; 705/1; 705/14; 706/925; 706/934
(58) Field of Search ..................................... 705/26, 1, 14; 706/925, 934

(56) References Cited

U.S. PATENT DOCUMENTS

| | | |
|---|---|---|
| 4,775,935 | 10/1988 | Yourick . |
| 5,353,218 * | 10/1994 | De Lapa et al. ...................... 364/401 |
| 5,430,644 * | 7/1995 | Deaton et al. ........................ 364/401 |
| 5,448,471 * | 9/1995 | Deaton et al. ........................ 364/401 |
| 5,481,094 * | 1/1996 | Suda .................................... 364/405 |
| 5,487,130 * | 1/1996 | Ichimori et al. ......................... 395/3 |
| 5,625,754 * | 4/1997 | Jungst et al. ............................ 395/51 |
| 5,710,884 * | 1/1998 | Dedrick .......................... 395/200.47 |
| 5,717,923 * | 2/1998 | Dedrick ................................ 364/401 |
| 5,724,573 * | 3/1998 | Agrawal et al. ..................... 395/606 |
| 5,727,120 | 3/1998 | Barrett et al. . |
| 5,727,129 | 3/1998 | Barrett et al. . |
| 5,727,199 | 3/1998 | Chen et al. . |
| 5,790,645 * | 8/1998 | Fawcett et al. ....................... 379/189 |
| 5,848,396 * | 12/1998 | Gerace .................................. 705/10 |
| 5,867,799 | 2/1999 | Lang et al. . |
| 5,930,764 * | 7/1999 | Melchione et al. ..................... 705/10 |
| 5,943,667 * | 8/1999 | Aggarwal et al. ....................... 707/3 |
| 5,970,482 * | 10/1999 | Pham et al. ............................ 706/16 |
| 6,012,051 * | 1/2000 | Sammon, Jr. et al. ................ 706/52 |
| 6,014,638 | 1/2000 | Burge et al. . |
| 6,049,777 * | 4/2000 | Sheena et al. ......................... 705/10 |
| 6,134,532 * | 10/2000 | Lazarus et al. ........................ 705/14 |

OTHER PUBLICATIONS

Mike Hogan, "Satellites, Radio, and Super Wireless for New High–Speed Net Access", PC World, Oct. 1997, p. 68–72.*

Bruce Krulwich, "Lifestyle Finder: Intelligent User Profiling Using Large–Scale Demographic Data", Al Magazine, Summer 1997, p. 37–45.*

(List continued on next page.)

Primary Examiner—Eric W. Stamber
Assistant Examiner—Steven F. Vincent
(74) Attorney, Agent, or Firm—Baker Botts L.L.P.

(57) ABSTRACT

A system and method for generating a user profile for a user based on a static profile and a dynamic profile of the user. The static profile includes factual user information. The dynamic profile includes dynamic rules which correspond to transactional information of the user. The method and system compresses the dynamic rules into aggregated rules so that the user can view a comparatively small number of the aggregated rules and select the desired rules from the aggregated rules based on user-desired criteria. The dynamic rules associated with the particular user are matched to the selected desired aggregated rules to generate the dynamic profile. The static and dynamic profile are then combined to form the user profile. The system and method can be used in conjunction with a Personal Shopping Assistant system and a Personal Intelligent Digital Assistant system.

42 Claims, 8 Drawing Sheets

OTHER PUBLICATIONS

Ch. Dujet et al, "About Modus Ponens and Aggregation of Rules", Fuzzy Systems, Mar. 1995, p. 1825–1832.*
Rakesh Agrawel et al, "Database Mining: A Performance Perspective", IEEE Transactions on Knowledge and Data Engineering, Dec. 1993, p. 914–925.*
Euntai Kim et al, "A New Approach to Fuzzy Modeling", IEEE Transactions on Fuzzy Systems, Aug. 1997, p. 328–337.*
C.B. Kappert et al, "Neural Networks and Business Modeling–An Application of Neural Modelling Techniques to Prospect Profiling in the Telecommunications Industry", System Sciences, Jan. 1997, p. 465–473.*
Mika Klemettinen et al, "Finding Interesting Rules from Large Sets of Discovered Association Rules", ACM, Nov. 1994, p. 401–407.*
R.R. Yager, "Fuzzy Summaries in Database Mining", Artificial Intelligence for Applications, Feb. 1995, p. 265–269.*
Paul Resnick et al., "Recommender Systems", Communications of the ACM, Mar. 1997, p. 56–58.*
Keung–Chi Ng et al., "Consensus in a multi–expert system", Proceedings of the 1990 ACM Annual Conference on Cooperation, 1990, p. 351–351.*
R. Cooley et al., "Grouping Web Page References into Transactions for Mining World Wide Web Browsing Patterns". Knowledge and Data Engineering Exchange Workshop, 1997, Proceedings, pp. 2–8.
Jesus Cerquides et al., "Fuzzy Metaqueries for Guiding the Discovery Process in KDD", Fuzzy Systems. 1997, vol. 3. Proceedings of the Sixth IEEE International Conference, pp. 1555–1559.
A. I. Kokkinaki, "On Atypical Database Transactions: Identification of Probable Frauds Using Machine Learning for User Profiling", Knowledge and Data Engineering Workshop, 1997, Proceedings, pp. 107–113.
"Creating a New Medium for Marketing and Selling", BroadVision, May 10, 1997.
"Firefly Ships Internet's First Solaris Solution for Managing Personalized Relationships with Users Online while Protecting their Privacy", Firefly Press Release, Oct. 14, 1997.
"Engage Technologies, a Subsidiary of CMG Information Services, Inc., Launches a Suite of Advanced Enabling Technologies for Accelerated, One–to–One Web Marketing", Engage technologies, Inc. Press Release, 1997.
C. Shum et al., "Implicit Representation for Extensional Answers", Expert Database Systems, Benjamin/Cummings Publishing Co., Inc., International Conference on Expert Database Systems, 1988, pp. 497–521.
H. Zimmerman, "Fuzzy Set Theory—and Its Applications", Kluwer–Nijhoff Publishing, pp. 11–22.
J. Quinlan, "C4.5:Programs for Machine Learning", Morgan Kaufmann Publishers, pp. 1–54.
L. Breiman et al., "Classification and Regression Trees", Wadsworth International Group, pp. 18–27.
A. Jhingran, "Data Mining and E–Commerce", IBM TJ Watson Research Center, Oct. 1997.
T. Fawcett et al., "Combining Data Mining and Machine Learning for Effective User Profiling", NYNEX Science and Technology.
"Engage Suite of Products", Engage Technologies.
M. Tucker, "Dough", Datamation, May 1997, pp. 51–58.
T. Fawcett, F. Provost, "Adaptive Fraud Detection", Data Mining and Knowledge Discovery, vol. 1, No. 3, Nov. 1987, pp. 291–316.
B. Lent, A. Swami and J. Widon, "Clustering Association Rules", Proc. of 13th International Conference on Data Engineering, Apr. 1997, U.K., pp. 1–19.
M. Pazzani, J. Muramatsu and D. Billsus, "Syskill & Webert: Identifying Interesting web sites", Proceedings of the National Conference on Artificial Intelligence, 1996.
M. Pazzani and D. Billsus, "Learning and Revising User Profiles: The Identification of Interesting Web Sites", Machine Learning 27, (1997) pp. 313–331.

* cited by examiner

SYSTEM AND METHOD FOR DYNAMIC PROFILING OF USERS IN ONE-TO-ONE APPLICATIONS

FIELD OF THE INVENTION

The present invention relates to a system and method for dynamic profiling of a user in one-to-one marketing applications.

BACKGROUND INFORMATION

Many organizations collect historical data about every transaction that every customer performs with that organization. Such historical transactional data is useful in various one-to-one marketing applications, such as, e.g., shopping assistant application and dynamic Web site content presentation. A number of problems have been encountered in these marketing applications. One such problem relates to the creation of highly pertinent and comprehensible individual user profiles that are derived from the historical transactional data. In addition, it is also important to have the ability to utilize these user profiles when the marketing application obtains a current status of the user. If the user profiles are generated in a highly relevant and comprehensible manner with respect to a specific user, the applications would be able to understand that user's needs better and more efficiently serve that user.

There are two basic types of user profiles that can be generated—a "static" profile and a "dynamic" profile. The static profile contains all of the factual information of the user including, for example, demographic data (e.g., age, sex, address), psychographic data (e.g., personality traits and habits), purchasing preferences (e.g., what does the user purchase in an average week), etc. Static profiles are generated using conventional methods that are known to those of ordinary skill in the art.

Dynamic profiling information includes specific rules describing the user's behavior. For example, such rules may include: "whenever user X travels to France, user X often buys expensive wines in Paris" or "when user Y shops on a weekend and did not buy any groceries for at least 3 days, user Y usually purchases a large amount of groceries." These rules can be generated with transactional data for each user using various rule generation methods that are generally known to those of ordinary skill in the art. For example, one such conventional rule generation method is implemented in a rule learning system which generates behavior rules for individual customers. (See T. Fawcett et al., "Combining Data Mining and Machine Learning for Effective User Profiling", Proceedings of the KDD'96 Conference, 1996, pp. 8–13).

In order to obtain an extensive understanding of the user, it is desirable to build both static and dynamic profiles for that user. Although the generation of static profiles is generally straight-forward, generating dynamic profiles for a large number of users may present potential problems. Many transactional systems (e.g., airline reservations systems, credit card transactional systems and/or Web site management systems) generate a various number of transactions for each user. For example, some systems and/or applications may only generate a dozen transactions per each user, which may not be enough to construct a statistically significant and reliable set of rules for a specific user. Even if there are enough transactions to construct a statistically significant set of rules, these rules should still be verified for their pertinence to the user. Since there can be a large number of users, and since the rules generated for each user may not be reliable, there is a problem of verifying a large set of generated rules for the users. For example, in a typical system facilitating 5 million users and providing about 100 rules per user, approximately 500 million rules would have to be either stored or processed. Generally, many of these rules are either not useful or insignificant. Thus, due to the amount of these generated rules, a rule validation process becomes considerably complicated. Furthermore, checking the usefulness of these rules "by hand" becomes practically impossible.

Conventional systems have not successfully provided detailed solutions to constructing reliable dynamic profiles for the users. One such system (described in T. Fawcett et al., "Combining Data Mining and Machine Learning for Effective User Profiling", Proceedings of the KDD'96 Conference, 1996) provides a limited generation of user's dynamic profiles. However, this conventional system does not provide a comprehensive method and system for analyzing a large number of dynamic rules, and thus does not provide adequate assistance for the user.

SUMMARY OF THE INVENTION

The system and method according to the present invention generates dynamic profiles and, thereafter, transforms the dynamic profiles for various users into aggregate rules. In particular, "similar" individual rules are compressed into a smaller number of aggregated rules. Because the total number of aggregate rules is substantially smaller than the total number of individual rules for all of the users, the aggregate rules can be examined manually by a human expert. This expert examines these aggregated rules and selects only rules based on the expert's preferences. Only the individual rules that correspond to the aggregated rules selected by the human expert are retained in the user's profiles. Since the selected aggregate rules were selected by the human expert, a creation of more accurate dynamic profiles is further assured. The system and method according to the present invention thus provide a more useful set of individual rules for each user.

The dynamic profiles generated with the system and method according to the present invention can be used in various systems (e.g., Personal Shopping Assistant and Personal Intelligent Digital Assistant) to provide better recommendations to the users as to which products and services each individual user should utilize. Accordingly, the user would be more satisfied with these systems and the suggestions that these systems provide to the user. In addition, Dynamic Web Content Presentation systems can include the system and method according to the present invention because the users will be provided with better quality profiles to facilitate the provision of more pertinent Web pages to the user visiting a particular Web site. Fraud detection systems may also include the system and method according to the present invention, thus providing higher quality user profiles which may facilitate better fraud detection. Other applications for the system and method according to the present invention are also conceivable to those of ordinary skill in the art.

In addition, the system and method according to the present invention utilizing the above-described rule compression method is not limited to a construction of pertinent dynamic profiles, and can be used in a vast variety of applications (e.g., construction of high quality association rules in data mining applications). Other usages of the system and method according to the present invention are also conceivable to one having ordinary skill in the art.

BRIEF DESCRIPTION OF THE DRAWINGS

FIG. 6b shows a first system for generating the user profiles according to the present invention as illustrated in FIG. 6a.

FIG. 6c shows a second system for generating the user profiles according to the present invention as illustrated in FIG. 6a.

DETAILED DESCRIPTION OF THE INVENTION

Figure 1:
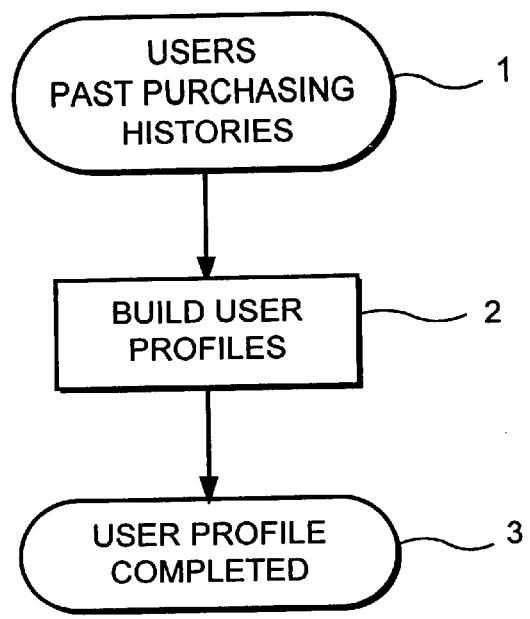
FIG. 1 shows a top level diagram of a process for generating user profiles.
Figure 2:
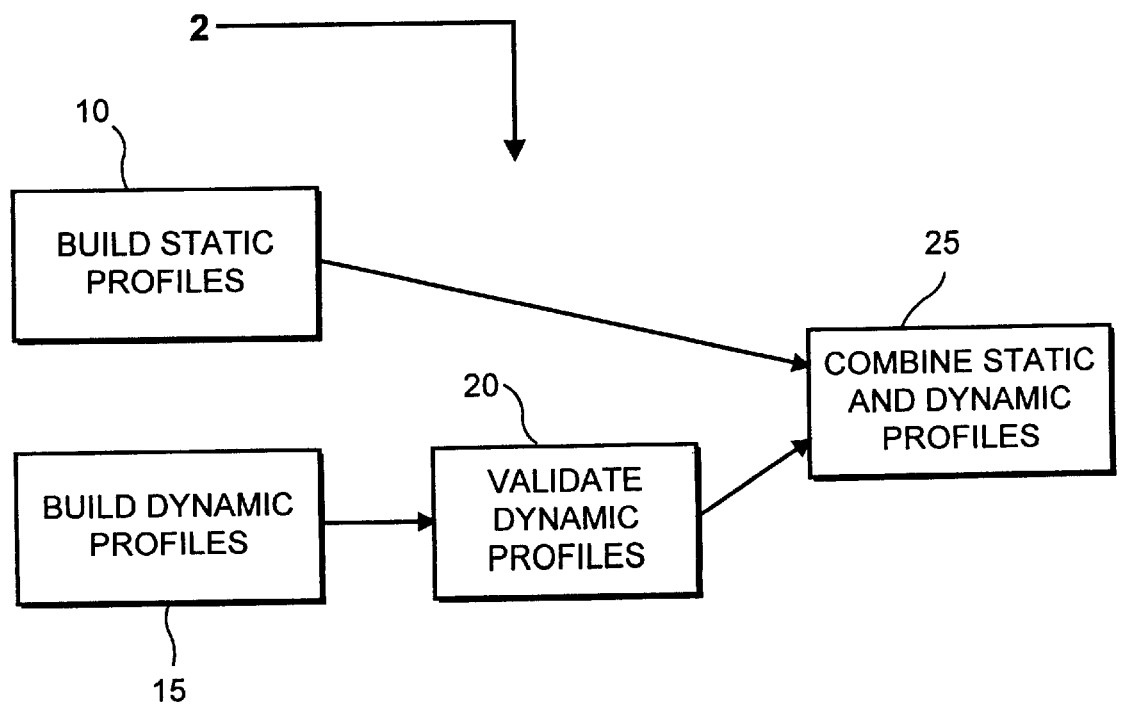
FIG. 2 shows a flow diagram for generating static and dynamic user profiles.

In many customer-related applications (e.g., banking, credit card, Internet marketing applications, etc.), user profiles for each user (or customer) are generated to better understand the user (i.e., user's purchasing trends, business travel locations, types of favorite restaurants, etc.). A flow diagram of an exemplary process for building user profiles is illustrated in FIG. 1. In particular, information regarding, e.g., the user's past purchasing history is retrieved in step 1. In step 2, user profiles are built, and the process completion is signaled in step 3. User profiles can preferably be generated using static profiles and dynamic profiles. A more detailed flow diagram of the process of building user profiles (represented in FIG. 1 by step 2) is illustrated in FIG. 2. The static profile includes user static characteristics (e.g., name of the user, address, telephone number, date of birth, sex, income, etc.). The static profile is built in step 10 using methods known to one having ordinary skill in the art. After the static profile is built, this static profile is stored in a separate file based on the data obtained from the CUST and TRANS files, as discussed below. The "CUST" file has the following format:

CUST(Cust_ID, $A_1, A_2 \ldots A_m$)

where Cust_ID is a user identifier that provides an index value for locating a specific user in the CUST file. $A_1, A_2 \ldots A_m$ are fields describing the characteristics of the user (e.g., sex, income, education, etc.).

The dynamic profile is built in step 15. A dynamic profile consists of rules (or patterns) characterizing a user's behavior, e.g., "if user X shops in the evening on weekdays and purchases diapers, user X also buys beer", "if user X shops on weekdays, user X usually buys a small number of items", "if user X travels to New York on business, user X prefers to have lunches at expensive seafood restaurants." The rules are derived from a set of transactions pertaining to a particular user. These transactions may be, for example, credit card transactions, airline reservations and Web site visit transactions, and are stored in the "TRANS" file which has the following format:

TRANS(Trans_ID, Cust_ID, $C_1, C_2, \ldots C_n$)

where Trans_ID corresponds to a unique index key that identifies the transaction being performed by the user. Fields $C_1, C_2, \ldots C_n$ identify a particular transaction (e.g., date of transaction, time of transaction, amount spent, location of the transaction, etc.). The field "Cust_ID" corresponds to an index key pointing to a particular user having a respective record in the CUST file. Thus, the user performing a particular transaction can be identified. Other file formats can also be utilized, as can be understood by those having ordinary skill in the art. For example, the user-specific information can also be stored in several files rather than in a single CUST file (thus, the CUST file can be normalized by splitting the CUST file into several smaller files). Using different file formats does not affect the operability of the system and process according to the present invention. After the dynamic profile for a particular user is generated, this dynamic profile is validated in step 20.

After the validation of the dynamic profile, the static and dynamic profiles are combined to form a combined user profile in step 25. The following exemplary information can be obtained from the TRANS file to be provided into the static profile when the static and dynamic profiles (the CUST and TRANS files) are combined: a) an average transaction amount for user X; b) user X's favorite brand of beer is, e.g., Heineken; c) user X shops mostly on week-ends.

While it is relatively uncomplicated to construct user static profiles, it is much more difficult to construct quality dynamic profiles. Rules provided in the dynamic profile are generated for each user. Because a user may perform only a small number of transactions, the corresponding rules generated may be statistically insignificant, unreliable and irrelevant. In many systems (e.g, airline reservations systems, credit card transactional systems, or Web site usage systems), it is possible to have from as little as a few dozen to a few hundred transactions per each user. The rules generated with such amounts of data are often ineffective and insignificant.

The total number of generated rules can also be very large. For example, in a system serving 5 million customers and generating an average of 100 rules per user, a total number of generated rules can reach 500 million. Many of the 500 million generated rules are of questionable quality and usefulness. In order to filter the rules having such undesirable characteristics, a human expert must decide which dynamic rules should be stored and which dynamic rules should be discarded. It would be impossible for the human expert to manually check the usefulness of all 500 million rules.

Quality dynamic profiles are generated by validating dynamic rules generated using various rule induction methods. Ultimately, however, the human expert validates the machine-generated rules to determine their "usefulness" in various systems. Since most of the systems generate too many rules to be manually examined by human experts, the system and method according to the present invention facilitates compressing individual rules into "aggregated" rules. After the individual rules are compressed into the aggregated rules, the aggregated rules are evaluated by a human expert who selects only the rules that the expert believes are pertinent for the user. In addition, it is possible (in some applications) that the respective user can be such a human expert (and examining only the rules that are pertinent to the respective user).

A. Dynamic Profile Construction Procedure

It can be assumed that user-specific rules have been already created using methods known to those having ordinary skill in the art. For example, individual user rules can be generated using an induction software system (e.g., "CART" Breiman et al., 1984; C4.5, Quinlan, 1993; or RL, Clearwater & Provost, 1990). The structure of these rules has, preferably, the following form:

$$C_{i1}\theta_{i1}a_{i1} \wedge C_{i2}\theta_{i2}a_{i2} \wedge \ldots \wedge C_{ik}\theta_{ik}a_{ik} \Rightarrow C_i\theta_i a_i \quad (1)$$

where $C_{i1}, C_{i2}, \ldots, C_{ik}, C_i$ are fields from the TRANS file, $a_{i1}, a_{i2}, \ldots, a_{ik}, a_i$ are constants, and $\theta_{ij}$ are relational operators (e.g., "=", ">", "<", etc.). In addition, each rule is assigned to a user defined by the Cust_ID (user identifier) from the CUST file.

Figure 3:
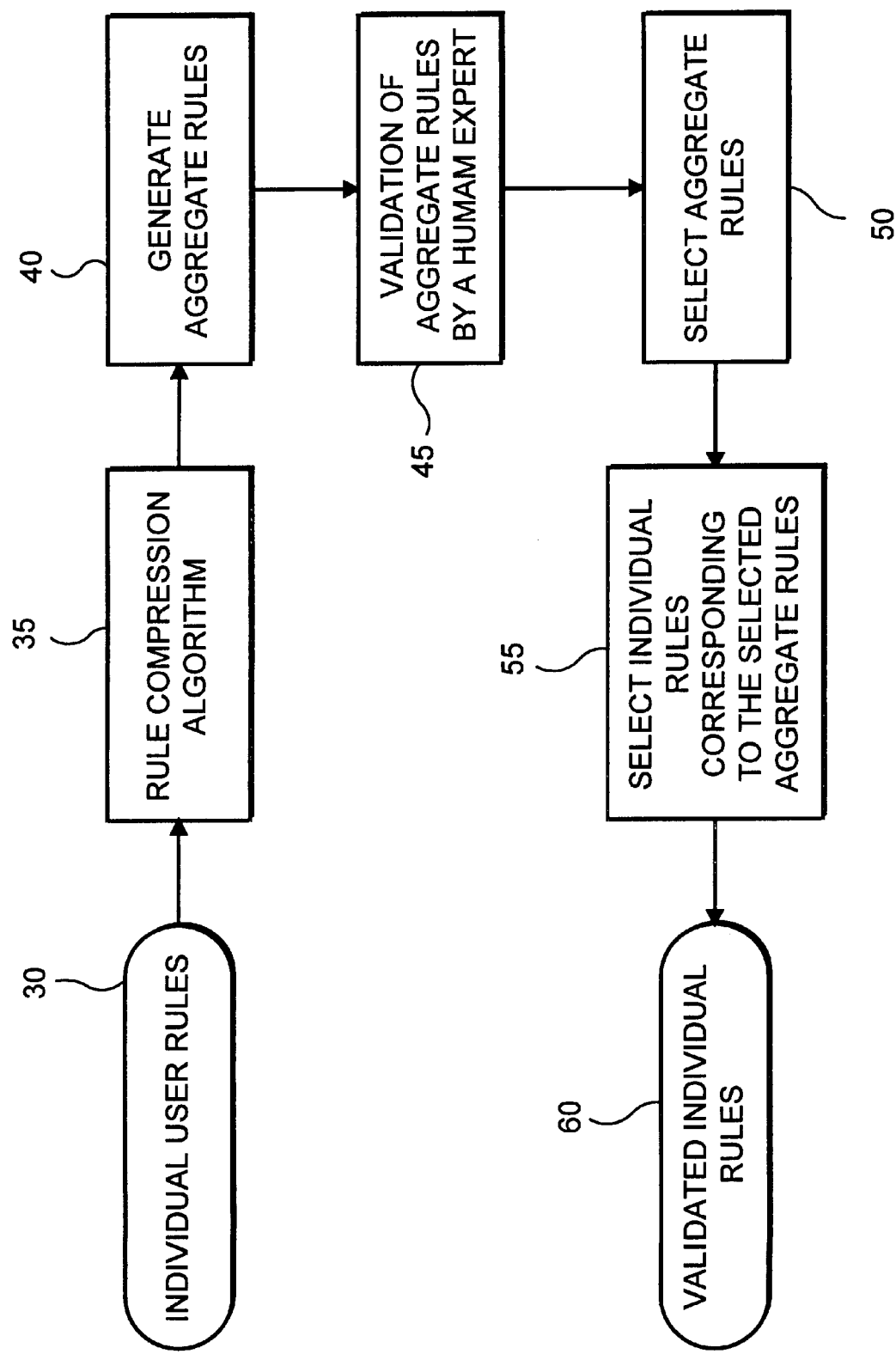
FIG. 3 shows a flow diagram of a process for compressing dynamic rules, generating aggregate rules, validating the aggregate rules and creating user profiles.

Next, it is important to remove "useless" individual rules from the total number of rules. A process to remove these useless individual rules is shown in FIG. 3. In step 30, individual rules are provided for processing. In step 35 several "similar" individual rules (of the form (1)) are compressed into one aggregated rule of the form:

$$A_{i1}\theta_{i1}b_{i1} \wedge A_{i2}\theta_{i2}b_{i2} \wedge C_{i1}\theta_{i1}a_{i1} \wedge C_{i2}\theta_{i2}a_{i2} \wedge \ldots \wedge C_{ik}\theta_{ik}a_{ik} \Rightarrow C_i\theta_i a_i \quad (2)$$

where $A_{i1}, \ldots, A_{ij}$ are the fields in the CUST file, $b_{i1}, \ldots, b_{ij}$ are constants, and $\theta_{ij}$ are relational operators (e.g., "=", ">", "<", etc.). For each individual rule of the form (1), the aggregated rule of the form (2) is formed after the individual rules are compressed. The newly aggregated rules (formed in step 40) can be, e.g., fuzzy rules, and the operators $\theta_{ij}$ should also be, e.g., fuzzy operators. For example, several of the individual rules that are similar (generally pertaining to different users) can be compressed into one aggregated rule pertaining to the same subject matter that can be applicable to several users. For example, if several rules have the form:

IF Shopping_time="evening" and Day_of_week="weekday" and Purchase="diapers" THEN Purchase="beer", and it is known that most of the users corresponding to this rule are males, then these rules can be compressed into the aggregated rule having the following form:

IF Sex="Male" and Shopping_time="evening" and Day_of_week="weekday" and Purchase="diapers" THEN Purchase="beer".

Additional fields (e.g., Sex, etc.), unlike other fields in the above exemplary rule, are fields from the CUST file. Individual rules relating to different users can be compressed into the same aggregated rule for a group of users. Thus, the rule compression can preferably be implemented for different users. The number of aggregated rules (of the form (2)) generated by the compression algorithm should be much smaller than the initial number of individual rules. Then, in step 45, the aggregated rules can be validated (one by one) by the human expert (including a particular user) to determine which rules are appropriate for that user. After the user validates the aggregated rules, this user selects the set of preferred aggregated rules in step 50. Only the individual rules corresponding to the aggregated rules selected in step 50 are retained in the user's dynamic profile (step 55) to provide validated individual rules (step 60) to the user.

B. Rule Compression Process

Figure 4:
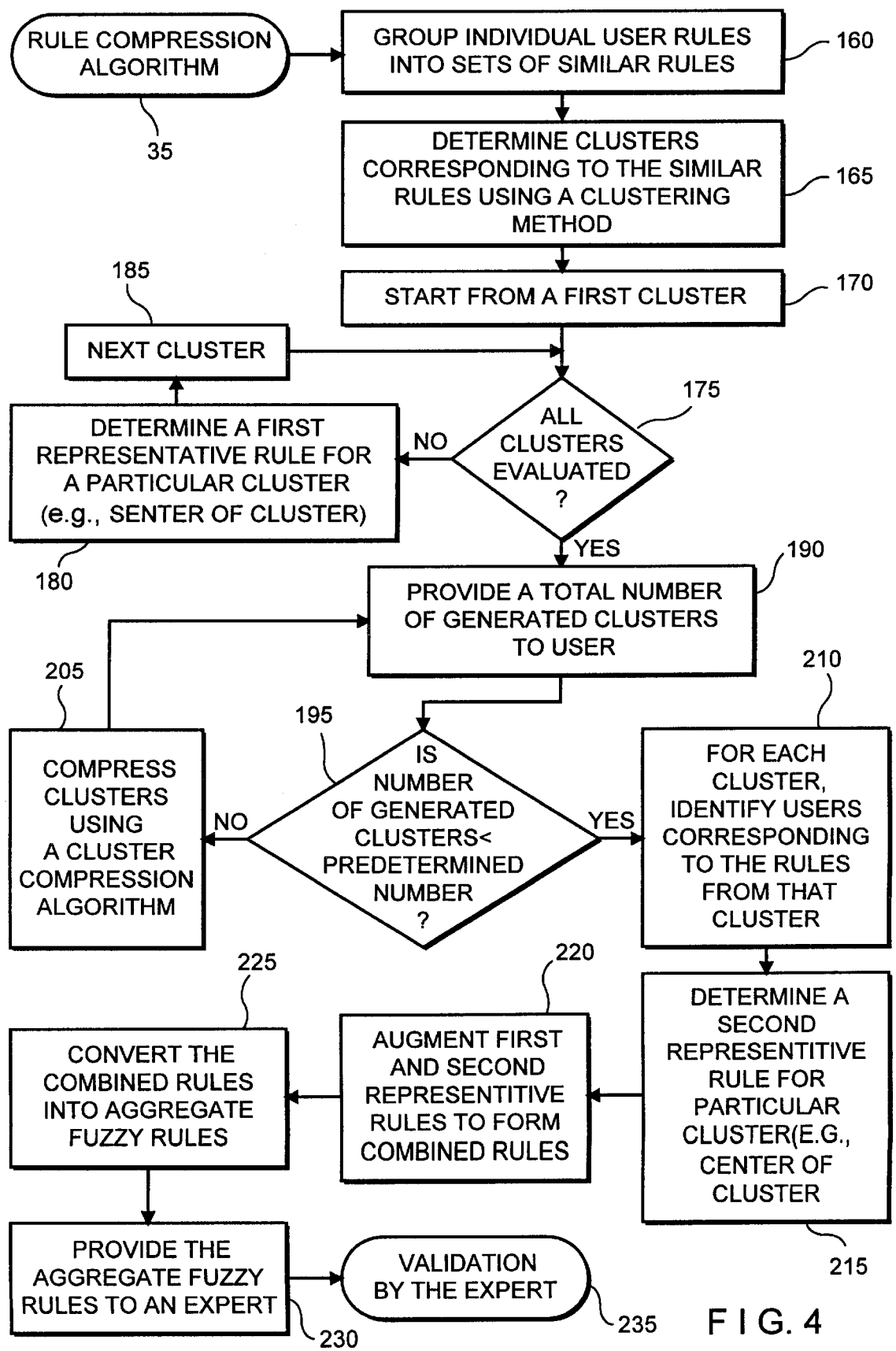
FIG. 4 shows a detailed flow diagram of an exemplary rule compression process according to the present invention.

FIG. 4 illustrates a detailed flow diagram of an exemplary rule compression process (starting from step 35 in FIG. 3). Two individual rules of the form (1) are referred to as "similar" rules if they differ from each other only in the values of their respective constants $a_{ij}$. Thus, similar rules should have the same number of terms, the same fields $C_{ij}$, and the same comparison operators $\theta_{ij}$. Similar rules can be mapped into the (k+1) dimensional space defined by Dom $(C_{i1}) \times \ldots \times \text{Dom}(C_{ik}) \times \text{Dom}(C_i)$, where Dom is a domain (or range of values) of the field C, with a rule having the form (1) being mapped into the points (i.e., $a_{i1}, a_{i2}, \ldots, a_{ik}, a_i$). This set of points is generated by similar rules. For example, the rule "if user X shops in the evening on weekdays and purchases diapers, user X also buys beer" can be written as:

IF (Shopping_time="evening" and Day_of_week="weekday" and Purchase="diapers") THEN Purchase="beer".

This sample rule would be mapped into the corresponding vector ("evening", "weekday", "diapers", "beer") of the 4-dimensional space of attributes (variables):Shopping_time, Day_of_week, Purchase and another Purchase.

The exemplary rule compression process (described below in detail) then generates rules (e.g., fuzzy rules of the form (2)). These fuzzy rules utilize fuzzy linguistic variables for the fields from the CUST and TRANS files, which are generally known to those having ordinary skill in the art. Each fuzzy linguistic variable has a corresponding identifier (e.g., Income, Transaction_Amount, etc.), each being capable of providing a range of values (e.g., natural numbers between 0 and 1,000,000), a set of terms (e.g., "low", "medium", "high", etc.), and a membership function that assigns a membership value (e.g., between 0 and 1) to each value from the domain of the fuzzy linguistic variable for each range of values. In addition, the non-ordered fields in the CUST and TRANS files (e.g., "Product_Purchased") have assigned classification hierarchies; for example, the field "Product_Purchased" can include standard classification hierarchies used in marketing. Thus, UPCs, e.g., can be grouped into brands, brands can be grouped into product categories, etc.

The following exemplary inputs are provided to the Rule Compression Process:

a. Individual rules from users' dynamic profiles.
b. Fuzzy linguistic variables for all fields in the CUST and TRANS files.
c. Hierarchical classifications for non-ordered fields.

Exemplary outputs generated by the Rule Compression Process are a set of (preferably) fuzzy aggregated rules having the form (2).

The steps of the exemplary rule compression process shall now be described in detail with reference to FIG. 4. In step 160, all the individual rules of the form (1) are grouped into sets of similar rules (i.e., rules having the same structure). The maximal number of such similar groups is $4^n$, where n is the number of fields in the TRANS file. For example, if n=10, then there can be at most $1 \times 2^{20}$ similar groups. However, this number is typically much smaller in practice. Each set of similar rules forms a set of points in a k-dimensional space generated by the individual rules described above. In step 165, a group of clusters of the generated points is determined using any of the cluster computation methods known to those of ordinary skill in the art. In step 170, starting from the first cluster of the group of clusters determined in Step 165, an approximate rule for that cluster is determined in Step 180. The approximate rule is determined as a function of the points in the cluster. For example, a point in the cluster may be the "center" of the cluster. The center can be identified as a point that minimizes the sum of distances from a particular point to other points in the cluster. For example, given Cluster $C_i = (C_{i1}, c_{i2}, \ldots c_{ik})$, the center of this cluster is the point that minimizes the expression:

$$\min_{c_i} \sum_{x \in Clust_i} d(x, c_i)$$

The center of the cluster can also be determined using other methods, such as, e.g., selecting the most "representative" point in that cluster.

In step 185, the next cluster is selected and the procedure described with respect to step 180 is repeated. In step 175, it is determined whether all of the clusters in the group of clusters have been evaluated. As an illustration, if cluster $Clust_i$ contains three 3-dimensional points $(-1,0,1)$, $(1,0,1)$, $(0,\sqrt{3},1)$, corresponding to the vertices of a equilateral triangle, then the center of this cluster $C_i$ is the center of the triangle, i.e., the point $(0,1/\sqrt{3}, 1)$. Other approaches to defining the center of a cluster can be used. This exemplary rule compression process does not depend on any specific method for defining any center of a cluster $C_i$.

Given the set of rules (1) corresponding to the cluster with the center $C_i=(C_{i1}, c_{i2}, \ldots c_{ik})$, the corresponding aggregated rule has the form:

$$C_{i1}\theta_{i1}a_{i1} \wedge C_{i2}\theta_{i2}a_{i2} \wedge \ldots \wedge C_{ik}\theta_{ik}a_{ik} \rightarrow C_i\theta_i c_i \quad (3)$$

which is a "representative" rule for the cluster of similar rules. For example, if the center of the cluster is $(0,1/\sqrt{3},1)$, the following rule is generated:

$$C_1=0 \wedge C_2=1/\sqrt{3} \rightarrow C_3=1.$$

Also, for totally ordered fields $C_{ij}$, standard deviations $\sigma_{ij}$ of the points in that cluster are calculated for that field. For unordered categorical fields $C_{ij}$, a measure of the "deviation" of the points is determined in that cluster along the j-th dimension from $c_{ij}$ (by using the hierarchical classification for that field).

In step 190, a total number of clusters generated in Step 165 is provided to the user. In step 195, the user is asked if there are too many of the generated clusters for manually inspecting the aggregated rules (i.e., the number of generated clusters is greater than a predetermined number). If so, the generated clusters are compressed using a cluster compression process described in step 205. Thereafter, there is a smaller number of clusters (and corresponding aggregation rules per cluster). The user is asked again, in step 195, if there are too many generated clusters for the manual inspection of aggregated rules. If the number of clusters is smaller than the predetermined number, for each cluster $C_i$ obtained in step 165 or in step 205, a set of users corresponding to the points for that cluster is identified in step 210. Each point in a cluster corresponds to a first representative rule from the dynamic profile of the user, so that all of the users corresponding to the dynamic profile rules from that cluster can be identified. For example, CUST_$ID_i$ is defined as a set of values Cust_$ID_{ij}$ corresponding to the users corresponding to the rules of cluster $C_i$. A set of records ("$CUST_i$") from the CUST file corresponding to the users of that cluster is identified (i.e., having user ID values from the set CUST_$ID_i$). Thus, $CUST_i=\{r|CUST(r)$ and $r.Cust\_ID \in CUST\_ID_i\}$.

The set of records $CUST_i$ form a set of points in m-dimensional space (where m is the number of fields in the CUST file). These points are separated into clusters using the same techniques as described in step 165. For each resulting cluster $CUST_{ij}$, a center is located as explained below. The set of points belonging to that cluster is approximated with a logical statement having the form:

$$A_1\theta_{ij1}b_{ij1} \wedge A_2\theta_{ij2}b_{ij2} \wedge \ldots \wedge A_m\theta_{ijm}b_{ijm} \quad (4)$$

to form a corresponding condition in step 215, where $A_i$ are the fields of the CUST file, $\theta_{ij1}$ are relational operators (e.g., "=", "<", ">", etc.) and $b_{ij1}$ are constants. One way to construct the condition (4) would be by finding the center $b_{ij}=(b_{ij1}, \ldots, b_{ijm})$ of the cluster $CUST_{ij}$ as described in step 180, and substituting the values of $b_{ij1}$ into the condition (4) (also setting all the relational operators to be "="). Another way to construct this condition (4) is described in A. Motro, "Using Integrity Constraints to Provide Intentional Answers to Relational Queries", Proceedings of the 15th International Conference on Very Large Databases, 1989, pp. 237–246, and C. Shum et al., "Implicit Representation of Extensional Answers", Proceedings of the 2nd International Conference on Expert Database Systems, 1988.

In step 220, the first and second representative rules are augmented (i.e., expression (4) is augmented with expression (3)). The resulting rule is:

$$A_1\theta_{ij1}b_{ij1} \wedge A_2\theta_{ij2}b_{ij2} \wedge \ldots \wedge A_m\theta_{ijm}b_{ijm} \wedge C_{i1}\theta_{i1}c_{i1} \wedge C_{i2}\theta_{i2}c_{i2} \wedge \ldots \wedge C_{ik}\theta_{ik}c_{ik} \rightarrow C_{im}\theta_{im}c_i. \quad (5)$$

For example, assume that the center of a cluster is a rule: "if a user shops in the evening on weekdays and buys diapers, the user also buys beer" (i.e., IF Shopping_time="evening" and Day_of_week="weekday" and Purchase="diapers" THEN Purchase="beer"). Also, assume that most of the users in that cluster are men, thus forming the expression (4) where "Sex"="Male". Accordingly, the augmented rule is "if a male user shops in the evening on weekdays and buys diapers, the user also buys beer" (i.e., IF "Sex"="Male" and "Shopping_time"="evening" and "Day_of_week"="weekday" and "Purchase"="diapers" THEN "Purchase"="beer")

Then, in step 225, the rules of the form (5) generated in step 220 are converted into fuzzy aggregated rules. In particular, each field $A_i$ and $C_{ij}$ in the form (5) is mapped into a corresponding fuzzy linguistic variable associated with that field. In addition, all of the terms in the expression (5) are converted into appropriate fuzzy expressions. For example, assume that a non-fuzzy term $A_1=20$ corresponds to a fuzzy linguistic variable also denoted as $A_1$. Further assume that the term set for $A_1$ is either low or high, and that there is a membership function that assigns the membership value (e.g., between 0 and 1) to each value from the domain of fuzzy term $A_1$ for each value from the term set. Then, it can be determined for which term (i.e., low or high) the membership value 20 is higher, and a corresponding term is assigned. If the membership value is higher for the term "low", then the expression $A_1=20$ is replaced by $A_1=$LOW.

In step 230, the set of aggregated fuzzy rules generated by the rule compression process is shown to the human expert who selects only the meaningful and useful rules from this set according to user desired criteria.

C. Cluster Compression Process

Figure 5:
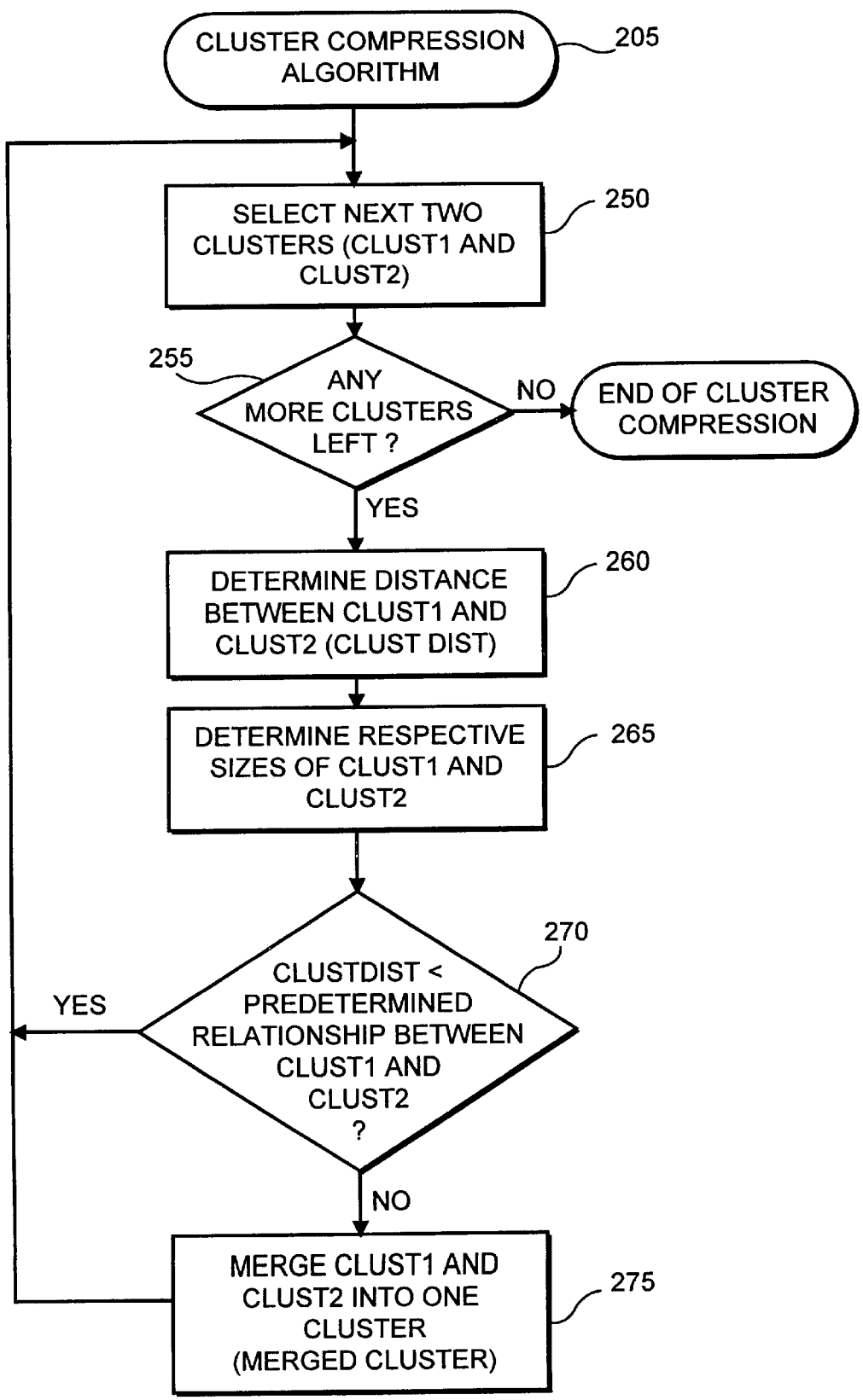
FIG. 5 shows a detailed flow diagram of an exemplary cluster compression process according to the present invention.

FIG. 5 shows an exemplary cluster compression process as discussed above with respect to step 205 illustrated in FIG. 4. As an initial matter, it is assumed that, e.g., clusters $Clust_1$ and $Clust_2$ are determined in step 165. Since $Clust_1$ and $Clust_2$ can be generated by dissimilar rules, the rules from each of these clusters $Clust_1$ and $Clust_2$ can be very different (or similar). Therefore, it is important to determine whether two different clusters are substantially similar to each other so that they can be merged. In particular, the distance between two aggregated rules of the form (3) corresponding to the centers of these clusters is determined to ascertain whether these different clusters are substantially similar. As an example, the following two aggregated rules corresponding to the center of $Clust_1$ and $Clust_2$ are considered:

$$C_1 = a \land C_2 < b \rightarrow C_4 = c, \text{ and}$$
$$C_1 = d \land C_3 = e \rightarrow C_4 = g$$

It may be also assumed that the domains of attributes C2 and C3 are discrete and ordered. These rules have different structure and therefore are different. In order to calculate the distance between these rules, we first have to bring these rules into the same 4-dimensional space of attributes $C_1$, $C_2$, $C_3$, and $C_4$. This can be done by replacing these rules with the rules $$C_1 = a \land C_2 = z \land C_3 = x \rightarrow C_4 = c \quad (6)$$

$$C_1 = d \land C_2 = y \land C_3 = e \rightarrow C_4 = g \quad (7)$$

where x and y are uniformly distributed random variables ranging over the domains $Dom(C_3)$ and $Dom(C_2)$ of attributes $C_3$ and $C_2$ respectively and z is a uniformly distributed random variable ranging over the domain of $Dom(C_2)$ from its smallest element to b. It should be noted that the term $C_2 < b$ (the first aggregated rule described above) should be replaced with $C_2 = z$ in rule (6). In addition, term $C_3 = x$ is provided into the first aggregated rule and term $C_2 = y$ is provided into the second aggregated rule. It is also assumed that, e.g., random variables x, y, and z are uniformly distributed over their respective domains.

If constants are substituted for the variables x, y, and z, the terms of the aggregated rules (6) and (7) will contain only equalities and constants. Thus, these aggregated rules (with the above-described substitutions) will have respective points in the same 4-dimensional space. If the distance between these two points can be calculated for fixed values of variables x, y, and z—$d(Clust_1 (x,z), Clust_2 (y))$ (i.e., if all the attributes are numeric, then the distance can be a Euclidean distance; if some of the attributes are categorical and unordered, the distance can be calculated in terms of how far the nodes are in the aggregation hierarchy defined for that attribute)—then the distance between clusters $Clust_1$ and $Clust_2$ is equal to:

$$d(Clust_1, Clust_2) \frac{1}{(Dom(C_2)) * (Dom(C_3)) * (b \min(Dom(C_2)))}$$
$$\sum_{x \in Dom(C_3), y \in Dom(C_2), z \leq b} d(Clust_1(x, z), Clust_2(y))$$

since it can be assumed that the domains of attributes $C_2$ and $C_3$ are discrete. If these domains were continuous, integration would have been used instead.

In general, let $c_1 = (c_{11}, c_{12}, \ldots c_{1k})$ and $c_2 = (c_{21}, c_{22}, \ldots, c_{2m})$ be the centers of two clusters $Clust_1$ and $Clust_2$ as calculated in steps 170 through 185 illustrated in FIG. 4, where $c_1$ and $c_2$ are vectors with different dimensions (because different rules can have different numbers of terms). The rules corresponding to the centers of these two clusters are extended with, e.g., dummy attributes and dummy random variables that form a union of the attributes for clusters $Clust_1$ and $Clust_2$. Assuming that the dummy variables are uniformly distributed over their domains, the distances between the two rules for fixed values of random variables can be calculated. Thereafter, the random variables are either integrated (for continuous random variables) or summed (for discrete random variable) over different values of these random variables. Thus, the distance between clusters can be determined using the system and method according to the present invention.

Once the distance between the two clusters is determined, the clusters can be merged as follows. In order to perform this operation, the size of the cluster should be determined as a part of the Cluster Compression process. The size of the cluster is the measure of how far the points of the cluster are apart from each other. This size can be determined, e.g., using the following formula:

$$size(Clust) = \frac{1}{|Clust|} \sum_{x \in Clust} d(x, c)$$

where c is the center of the cluster. Other measurements can also be used by those having ordinary skill in the art.

The flow diagram in FIG. 5 illustrates an exemplary process for compressing clusters. In particular, two clusters $Clust_1$ and $Clust_2$ are selected in step 250. There are a number of ways to determine which clusters should be selected in step 250. The simplest way to select the clusters is in an arbitrary manner. In step 260, the distance between the clusters is determined, as discussed above. In step 265, the respective size of each cluster is determined. In step 270, a check is performed to determine if the distance between the clusters $\{d(Clust_1, Clust_2)\}$ is smaller than the sizes of these clusters (e.g., to determine if these two clusters are "close enough" to each other). If so, the clusters should be merged into one cluster in step 275; otherwise, the clusters are maintained as separate clusters. In particular, an inquiry as to whether two clusters are "close enough" can be computed in the following manner, e.g.:

$$\frac{2 * d(Clust_1, Clust_2)}{size(Clust_1) + size(Clust_2)} < \alpha \quad (8)$$

where $\alpha$ is a predetermined threshold value. The two clusters should be merged by forming a new cluster consisting of points from $Clust_1$ and $Clust_2$ if condition (8) occurs. Steps 250–275 should be repeated until there are no more clusters left that can be merged (see step 255).

In deciding which clusters $Clust_1$ and $Clust_2$ should be chosen in step 250 of the cluster compression process, distances between, e.g., all pairs of clusters can be calculated and condition (8) can be checked to ascertain which clusters should be merged. Other methods to select the clusters for compression can also be used. Furthermore, the distance between all the pairs of clusters does not necessarily have to be calculated.

The system according to the present invention can be used in a Personal Shopping Assistant (PSA), a Personal Intelligent Digital Assistant (PIDA), and in a dynamic Web content presentation system, described below.

Figure 6A:
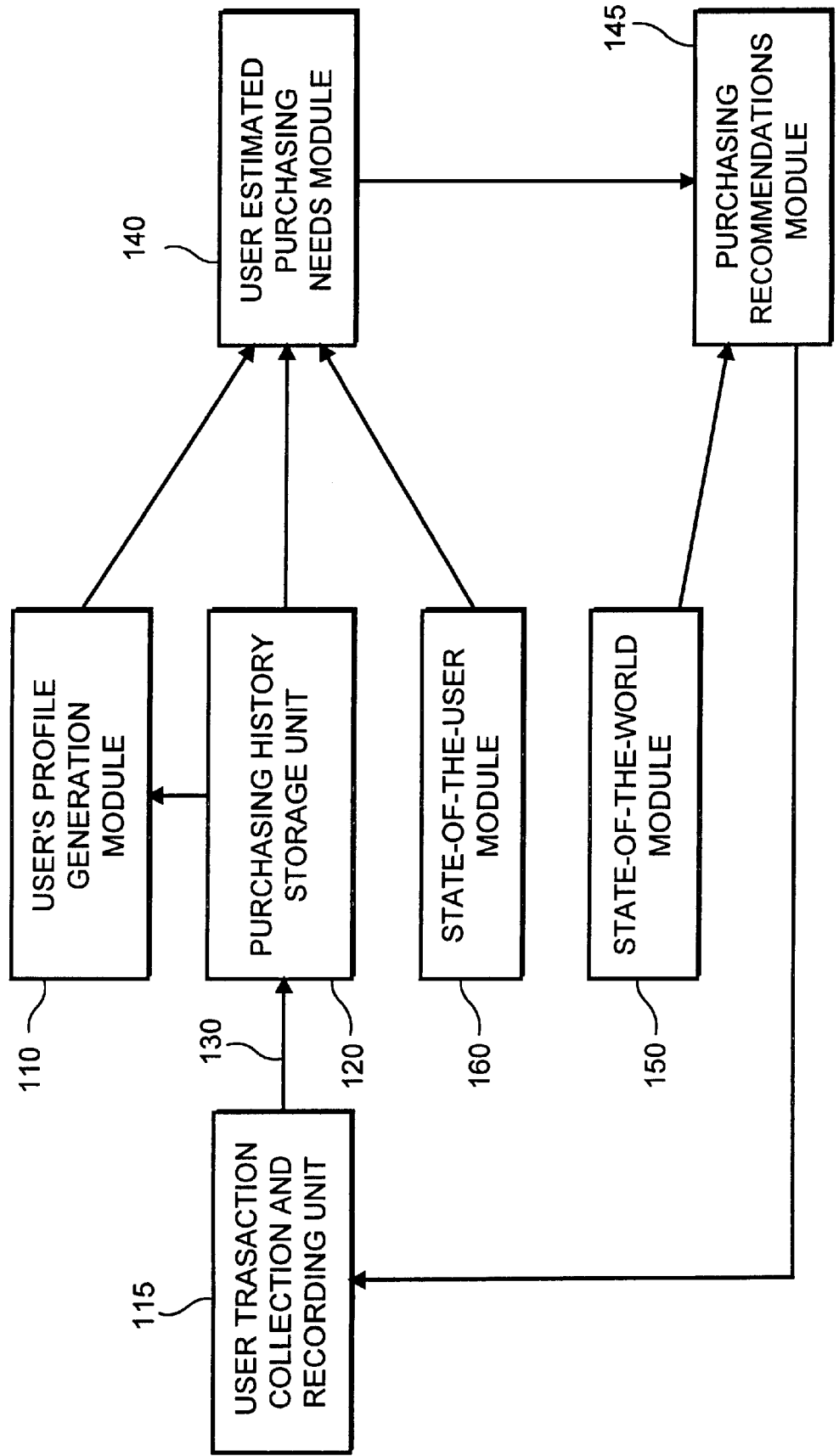
FIG. 6a shows an exemplary system for generating user profiles according to the present invention.

A Personal Shopping Assistant (PSA) system according to the present invention provides recommendations on the products and services that its users should consider purchasing (including, e.g., suggestions for purchasing at a specific source, and at a particular price). An exemplary embodiment of the PSA system according to the present invention is shown in FIG. 6a. In particular, the system includes a User Transaction Collection and Recording Unit (or module) 115, a Past Purchasing History Storage Unit (or module) 120, a User Profile Generation module 110, a State-of-the-World module 150, a User Estimated Purchasing Needs module 140, a Purchasing Recommendations module 145, and the State-of-the-User module 160.

The User Transaction Collection and Recording Unit 115 collects most of the shopping transactions performed by the user (e.g. 80–90% of all the purchases made by the user). The User Transaction Collection and Recording Unit 115 can be implemented as a "smart card," or as a smart Point of Sales register that records individual items purchased by the user. Alternatively, the user himself can record this information (as part of the User Transaction Collection and Recording Unit 115) using some transaction recording systems such as Qucken or Microsoft's Money.

When the user purchases one or more products, the User Transaction Collection and Recording Unit 115 records and transmits this information to the Purchasing History Storage Unit 120 where this information is stored as part of the purchasing history of the user. The Purchasing History Storage Unit 120 can be implemented, e.g., as a database that records transactions performed by various users in the TRANS file, as described above.

Information stored by the Purchasing History Storage Unit 120 is provided to User Estimated Purchasing Needs module 140. In order to estimate the user's purchasing needs, pertinent static and dynamic profiles of the user should be constructed based on the past purchasing histories obtained from the Purchasing History Storage Unit 120, which is performed by the User Profile Generation module 110. Static profiles include the user's demographic information (e.g., age, sex, marital status), particular preferences (e.g., user prefers a particular brand of beer), and certain purchasing decisions (e.g., the user bought a particular automobile in a particular month). Dynamic profiles include a set of rules (e.g., "if a user goes to France, the user often buys perfumes in Paris", "if user Y visits a Web site from the site Z in the evening, user Y does not spend a predetermined amount of time at site Z", etc.).

In addition, the PSA system maintains information on the current State of the World using the State-of-the-World module 150, which records information, e.g., on a broad range of products and services offered by various suppliers and on promotions and discounts run for these products and services. Also, the PSA system includes the State-of-the-User module 160 that maintains information about the user obtained from the Purchasing History Storage Unit 120 (e.g., the user will be in New York on Jun. 28, 1995 because she purchased an airline ticket for that date and destination) and various external information (e.g., the date, time, and the user's location, if available).

By knowing the purchasing history of a user (provided from the Purchasing History Storage Unit 120), the user's profile (provided from the User Profile Generation module 110), and the external information about the user (provided from the State-of-the-User module 160), the PSA system estimates the user's future purchasing needs using the User Estimated Purchasing Needs module 140. This Estimated Purchasing Needs module 140 may match the rules specifying which products the user will buy (and when) with the user's purchasing history. As a result, a set of products that the user should consider buying is produced.

Once future purchasing needs are estimated in Step 140, the PSA system will match these needs against a broad range of products and services offered by various suppliers and on the promotions and discounts run for these products and services. This matching process is performed by the Purchasing Recommendation module 145 using conventional methods that are known to those of ordinary skill in the art. For example, if the user needs to buy a pair of jeans within the next two months, the Purchasing Recommendations module 145 selects the merchants selling jeans, e.g, the cheapest pair of jeans that fits the use's requirements (considering the promotions offered within the next two months) by matching to the user profile (i.e., the user's purchasing needs). Once the Purchasing Recommendations module 145 matches the user's purchasing needs against the products and services, the Purchasing Recommendations module 145 provides purchasing recommendations to the user.

For example, based on the past purchasing history of a particular user, the PSA service may ascertain that whenever user X goes to France, user X often buys perfume in Paris. This rule is stored as a part of the user profile using the User Profile Generation module 110. In addition, the Purchasing History Storage Unit 120 of the PSA service may receive information that the user has purchased a ticket to Paris, and in a substantially same time period, the State-of-the-World Unit 150 of the PSA service also receives information that, e.g., Christian Dior has launched a new line of perfumes that is similar to the brands previously purchased by user X. In addition, the State-of-the-World Unit 150 may also receive information that the duty-free shop at Charles de Gaulle airport is having a sale on these new perfumes (the price being very competitive). Using the above-described exemplary information, the PSA service (using the User Estimated Purchasing Needs module 140) estimates that user X may want to buy these perfumes and sends a message to user X (via the Purchasing Recommendation module 145) to consider purchasing the new perfume at the duty-free shop at Charles de Gaulle airport.

The success of the PSA service depends primarily on accurate predictions by the PSA service of users' future needs. If the user finds, e.g., 50% of the PSA suggestions useful, the user will probably be satisfied with the PSA service. However, if the user finds, e.g., only 10% of the suggestions to be useful, the user will, most likely, reject this service. As indicated above, in order to make predictions of the user's future needs more accurate, it is important to build reliable user profiles. The present invention provides a method and system for generating better dynamic profiles and, therefore, providing more accurate predictions of the users' future needs.

Figure 6B:
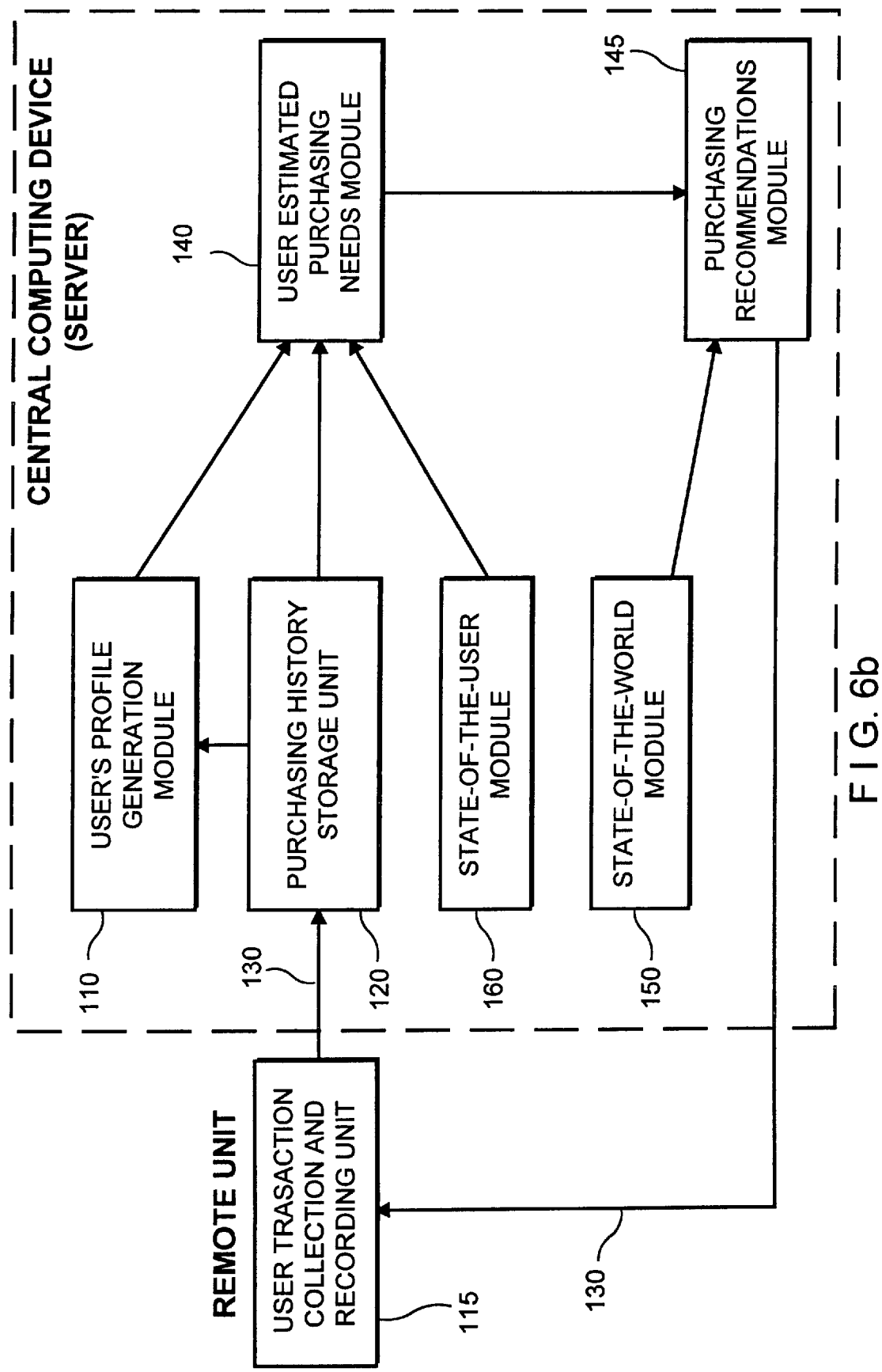
Figure 6C:
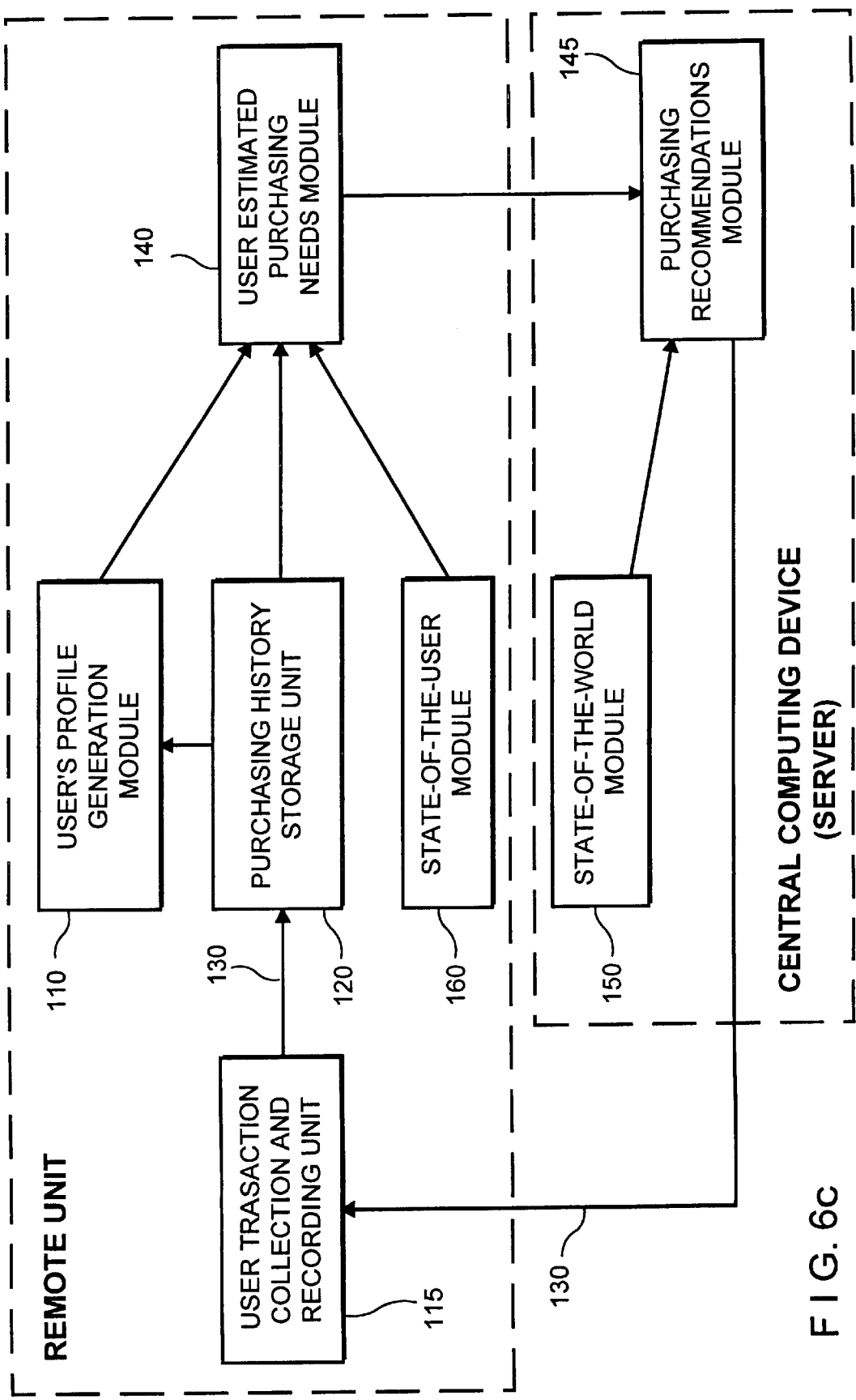

The PSA system illustrated in FIG. 6a can be implemented using a first exemplary system shown in FIG. 6b and a second exemplary system shown in FIG. 6c. The first exemplary system of FIG. 6b provides that the User Transaction Collection and Recording Unit 115 is stored on the client side. All other modules from FIG. 6a are stored on the server side and are connected to the User Transaction Collection and Recording Unit 115 via a Telecommunication Medium 130 (e.g., a telephone line or a wireless communication medium). In the first exemplary system, individual user purchasing histories and static and dynamic profiles of these users are stored on the server at a central location (e.g. a database), and the method and system according to the present invention (as described above) generates improved dynamic profiles, and thus provides better estimated purchasing needs of the users.

The second exemplary system of FIG. 6c provides that the User Transaction Collection and Recording Unit 115, the User's Profile Generation Module 110, the Purchasing History Storage Unit 120, the State-of-the-World module 150, the State-of-the-User module 160, and the User Estimated Purchasing Needs module 140 are stored on the client side, while the State-of-the-World module 150 and the Purchasing Recommendations module 145 are stored on the server side. In the second exemplary system, the user dynamic profiles are validated in Step 20 of FIG. 2 by the user (since these profiles are stored on the client side and are available to the user for checking and validating). Once module 140 estimates user purchasing needs, these estimated user purchasing needs are transmitted via the Telecommunication Medium 130 (e.g., a telephone line or a wireless communication medium) to the server, where the estimated user purchasing needs are matched by the Purchasing Recommendation module 145 to various products and services offered by various suppliers (that are stored on the server side). The resulting purchasing recommendations are transmitted back to the client side via the telecommunication medium 130 for the user's consideration.

Figure 7:
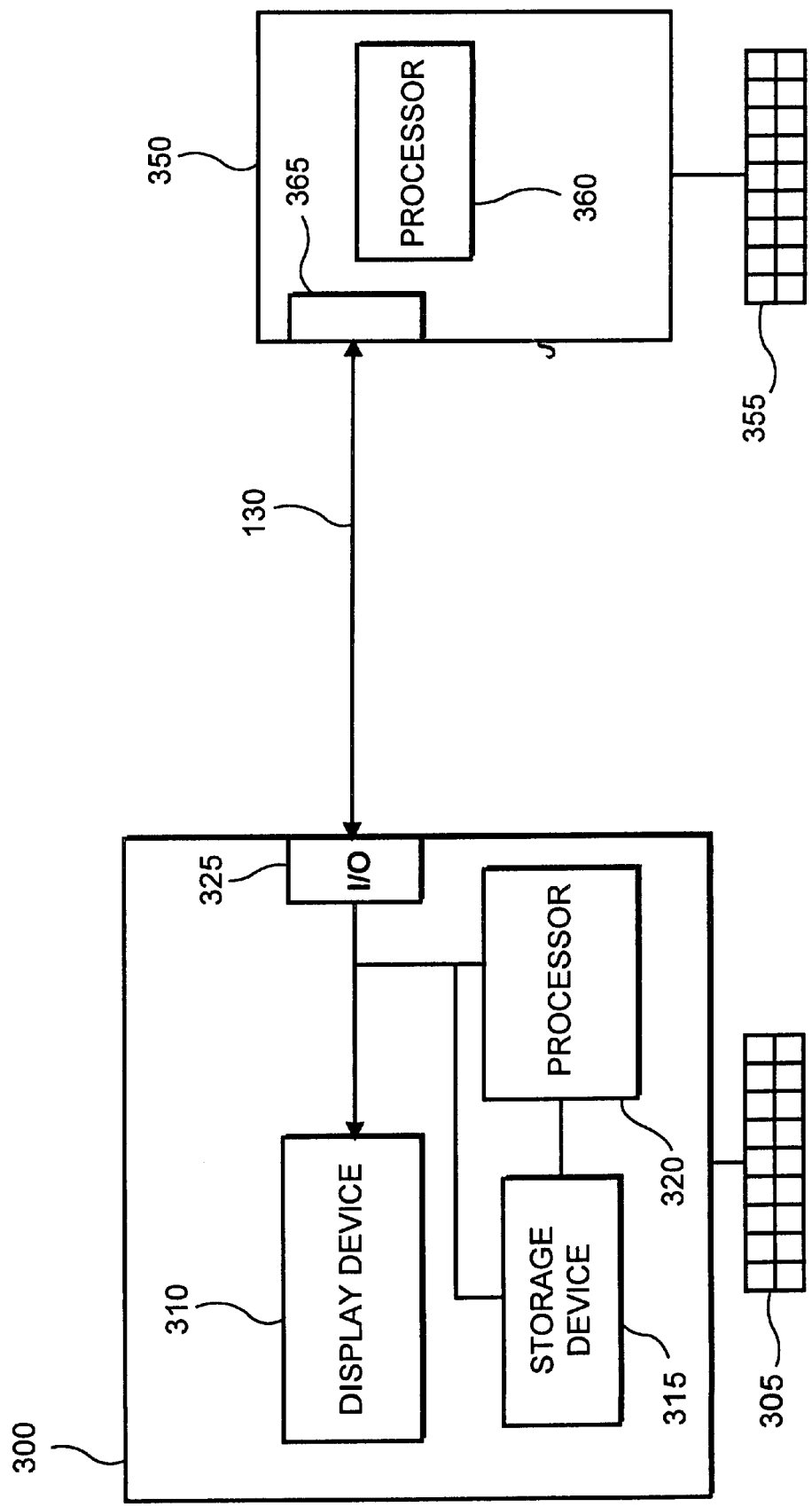
FIG. 7 shows a block diagram of an exemplary Personal Intelligent Digital Assistant system according to the present invention.

The PSA service can also be used in a Personal Intelligent Digital Assistant (PIDA) service as illustrated in FIG. 7. Each user subscribing to this additional service is provided with a Personal Digital Assistant (PDA) (e.g., the remote device 350 or the User Transaction Collection and Recording Unit 115), which is connected to the PSA system (e.g., a general purpose computer 300). The PDA remote device(s) 350 (which includes, e.g., a PDA processor 360, a PDA I/O port 365 and a PDA input device 355) and the PSA system(s) 300 (which includes, e.g., a display device 310, a storage device, a PSA processor 320, a PSA/I/O port 325 and a PSA input device 305) form a client-server architecture, in which the PDA remote device is a client and the PSA system is a server. The PSA system, using the Past Purchasing History Storage Unit 120 (e.g., a storage device 315) and the User Profile Generation module 110, the State-of-the-World module 150, the State-of-the-User module 160, the User Estimated Purchasing Needs module 140 and the Purchasing Recommendations module 145 (executed by, e.g., a processor 320) estimates users' future needs and behavior as described above. The PDA device accumulates additional information on the user's current state, such as the user's location information, preferences, and desires (e.g., the user is hungry now and wants to eat). This additional information is transmitted from the PDA device to the PSA system via the telecommunication medium 130 (e.g., a wireless network, fiber-optics communication system, telephone wired system, etc.) to be stored using the State-of-the-User module 160 (e.g., in the storage device 315) as part of the user's state and is used subsequently for estimating the user's purchasing needs.

For example, in order to illustrate how the PIDA service operates, assume that it is Tuesday, 11:30 am and that user X is driving in his car on I-87 in the Albany region on business, and that he indicated through his PDA device 350 that he wants to have lunch. The PDA device (350) records the current state of user X as "Tuesday, 11:30 am, presently driving in user X's car on I-87 in the Albany region, travel purpose is business, wants to have lunch." This information is sent from the PDA device 350 to the PSA system 300 via telecommunication medium 130. Based on user X's past purchasing history, the PIDA service recognizes that whenever user X is traveling on business, he likes to have light lunches at good quality restaurants and that he generally likes sea food. By examining user X's personal profile, and by matching the dynamic rule which provides that "whenever user X travels on business, he prefers light lunches at good quality restaurants", with user X's current state (user X is currently traveling on business), the PSA system 300 can predict that user X prefers a lunch at a good quality restaurant and he wants to eat light food. Next, the State-of-the-world module 150 of the PSA system 300 searches for highly rated seafood restaurants in the Albany region. If the PSA system 300 finds any such restaurant, user X is provided with restaurant choices (e.g., if more than one restaurant is located) by contacting user X's PDA device 350. If the PSA system 300 does not find first choice restaurants conforming to the user X's preferences, the PSA system 300 provides second choice restaurants to user X.

User needs are estimated based on purchasing history, the user's static and dynamic profiles and the current "state" of the user (sent to the PSA system from the PDA device). When the needs of the user are estimated (e.g. the user wants to buy a perfume in Paris, or wants to eat at a good seafood restaurant in the Albany region), they are matched with the current state of the "world." If the PIDA service finds good matches (e.g., Christian Dior perfumes are on sale at Charles de Gaulle airport in Paris, or that there is a good seafood restaurant in the Albany region serving special lunches and located very close to the user's current route), purchase recommendations are provided to the customer based on these matches. These recommendations are sent back from the PSA server 300 to the PDA device 350 via a telecommunication medium 130 (e.g., via e-mail or through another intelligent user interface).

The PIDA service incorporating the system and method according to the present invention can be used for notifying the users about various purchasing opportunities, both time sensitive (e.g., a particular sale will start next week) and spatial (e.g., if you need a new sweater, and sweaters you would probably like are on sale at the store near your work).

The system and method according to the present invention can also be incorporated in a Web site system. In conventional systems, when a user visits a particular Web site, the user usually sees the same contents, regardless of who the user is. Using the system and method according to the present invention (i.e., individual profiles for respective users), the dynamic Web content of the Web site presented to the user can be varied to conform to the dynamic profile of the user visiting the Web site. Furthermore, dynamic profile construction methods can also be used in fraud detection systems. In particular, a set of fraud detection rules can be dynamically generated for each user.

It should be noted that the use of the above-described rule compression process and the cluster compression process according to the present invention is not limited to a construction of user profiles. For example, these process can also be used for computing useful association rules in data mining applications, or in general compressing large sets of rules generated by data mining algorithms.

What is claimed is:

1. A method for generating a user profile for a user based on a static profile and a dynamic profile of the user, the static profile including factual user information, the dynamic profile including user dynamic rules provided as a function of transactional user information, the method comprising the steps of:
   a) retrieving the factual user information and the user dynamic rules;
   b) generating the static profile as a function of the factual and transactional user information;
   c) compressing the user dynamic rules into user aggregated rules;
   d) selecting at least one aggregated rule from the user aggregated rules based on a desired criteria;
   e) matching the user dynamic rules to the at least one selected aggregated rule to generate the dynamic profile; and
   f) combining the static profiles and the dynamic profile to form the user profile.

2. The method according to claim 1, wherein step (d) includes a substep of validating the user aggregated rules in the dynamic profile.

3. The method according to claim 1, wherein step (c) includes the following substeps:
   i. determining a plurality of similar dynamic rules from the user dynamic rules, ii. combining the plurality of similar dynamic rules into at least one corresponding cluster, and iii. generating the user aggregated rules as a function of the at least one corresponding cluster.

4. The method according to claim 3, wherein the at least one cluster includes a plurality of clusters, and wherein substep (iii) includes the following substeps:

A) determining a first representative rule for each cluster of the plurality of clusters, and B) if a number of the plurality of clusters is greater than a predetermined threshold number, compressing the plurality of clusters into a smaller number of the plurality of clusters.

5. The method according to claim 4, wherein substep (iii) further includes the following substeps:

C) identifying users providing the first representative rule which corresponds to a particular cluster of the plurality of clusters to form a user cluster, D) determining a second representative expression for the user cluster, E) augmenting the first representative rules and the second representative rules to form combined rules, and F) converting the combined rules into the user aggregated rules.

6. The method according to claim 5, wherein the user aggregated rules include fuzzy logic characteristics.

7. The method according to claim 4, wherein substep (B) includes the following substeps:

I. selecting a first cluster and a second cluster from the plurality of clusters, II. determining a cluster distance between the first cluster and the second cluster, III. determining a first size of the first cluster and a second size of the second cluster, IV. if the cluster distance between the first cluster and the second cluster is smaller than or equal to a predetermined relation between the first size and the second size, merging the first cluster and the second cluster to form a merged cluster, and V. if the cluster distance is larger than the predetermined relation, selecting a further first cluster and a further second cluster and repeating substeps II through IV using the further first cluster as the first cluster and using the further second cluster as the second cluster.

8. The method according to claim 7, wherein substep (B) includes the following substep:

VI. determining a center cluster of the plurality of clusters from the merged cluster.

9. The method according to claim 3, wherein each of the user aggregated rules is determined by obtaining a center of the at least one corresponding cluster.

10. The method according to claim 3, wherein the similar dynamic rules include non-identical rules.

11. The method according to claim 1, wherein step (a) further includes the substep of retrieving a previous dynamic profile of the user, and wherein step (f) includes the substep of combining the previous dynamic profile to the static profile and the dynamic profile to form the user profile.

12. The method according to claim 1, wherein at least one rule of the user aggregated rules includes a plurality of conditions.

13. The method according to claim 1, further comprising the step of:

g) before step (d), providing the user aggregated rules to an expert.

14. The method according to claim 1, wherein the desired criteria is a user-desired criteria.

15. A method for providing suggestions to a user based on a user profile associated with the user, comprising the steps of:

a) receiving user current state information associated with the user;

b) retrieving a static profile associated with the user, the static profile including factual user information corresponding to user preferences;

c) retrieving a dynamic profile associated with the user, the dynamic profile including rules corresponding to user repetitive transactions;

d) compressing the rules of the dynamic profile to form aggregated rules as a function of a predetermined similarity criteria;

e) selecting at least one rule from the aggregated rules based on a desired criteria;

f) matching user dynamic rules to the at least one selected rule to update the dynamic profile;

g) combining the static profile and the dynamic profile to form the user profile; and h) providing the suggestions to the user as a function of the user profile and the user current state information.

16. The method according to claim 15, further comprising the step of, i) after step (g) and before step (h), receiving present state-of-the-world information corresponding to the user profile and the user current state information.

17. The method according to claim 16, further comprising the step of:

j) after step (a) and before step (b), receiving past transactional information associated with the user.

18. The method according to claim 16, wherein step (d) includes the following substeps:

i. determining a plurality of similar dynamic rules from the user dynamic rules, ii. combining the plurality of similar dynamic rules into at least one corresponding cluster, and iii. generating the user aggregated rules as a function of the at least one corresponding cluster.

19. The method according to claim 18, wherein the similar dynamic rules include non-identical rules.

20. The method according to claim 15, wherein at least one rule of the aggregated rules includes a plurality of conditions.

21. The method according to claim 15, further comprising the step of:

k) before step (e), providing the aggregated rules corresponding to the dynamic profile to an expert.

22. The method according to claim 15, herein the desired criteria is a user-desired criteria.

23. A system for generating a user profile for a user based on a static profile and a dynamic profile of the user, the static profile including factual user information corresponding to substantially fixed user information, the dynamic profile including user dynamic rules corresponding to transactional user information, the system comprising:

a storage arrangement storing the static and dynamic profiles of the user; and a processor retrieving the factual user information and the user dynamic rules from the storage arrangement, the processor generating the static and dynamic profile as a function of the factual user information, the user dynamic rules being compressed by the processor to form user aggregated rules, the processor displaying the user aggregated rules to at least one of the user and a human expert, the processor receiving commands from at least one of the user and the expert to select at least one aggregated rule from at least one of the user and the human expert based on a desired criteria, wherein the processor matches the user dynamic rules to the at least one selected aggregated rule to generate the dynamic profile, and wherein the static profile and the dynamic profile are combined to form the user profile.

24. The system according to claim 23, wherein the processor receives transactional data from the user.

25. A method for providing suggestions to a user based on a user profile associated with the user, comprising the steps of:
  a) receiving user current state information and transactional information associated with the user;
  b) storing the transactional information as at least a portion of a user transacting history;
  c) providing the user transacting history to a user profile generation module for generating the user profile as a function of the user transacting history;
  d) estimating user needs information as a function of at least one of the user transacting history, user current state information and the user profile; and
  e) providing the suggestions to the user as a function of the user estimated needs information and state-of-the-world information.

26. The method according to claim 25, wherein the suggestions are generated as a further function of the state-of-the-world information, the state-of-the-world information including at least one of product-service location information, discount information and price information.

27. The method according to claim 25, wherein the user profile includes a static profile and a dynamic profile.

28. The method according to claim 27, wherein the dynamic profile is improved by compressing user dynamic rules to form user aggregated rules.

29. The method according to claim 25, wherein the user profile includes user rules, the user rules being matched to the user transacting history and the state-of-the-world information for generating the user needs information.

30. The method according to claim 25, further comprising the steps of;
  (f) before step (b) and after step (a), transmitting the transactional information from a remote device to a central computing device; and
  (g) after step (e), transmitting the suggestions from the central computing device to the remote device.

31. The method according to claim 25, further comprising the steps of:
  (h) before step (e) and after step (d), transmitting the user estimated needs information from a remote device to a central computing device; and
  (i) after step (e), transmitting the suggestions from the central computing device to the remote device.

32. The method according to claim 25, further comprising the step oft
  (k) providing the suggestions to the user via a display arrangement of a remote device.

33. The method according to claim 25, wherein the user transacting history includes a user purchasing history.

34. A system for providing suggestions to a user based on a user profile associated with the user, comprising:
  a first module receiving user current state information and transactional information associated with the user;
  a storage device storing as at least a portion of a user transacting history obtained from the transactional information;
  a second module receiving the user transacting history and generating the user profile as a function of the user transacting history;
  a third module estimating the user needs information as a function of the user transacting history, the user profile and the user current state information; and
  a fourth module providing the suggestions to the user as a function of the user estimated needs information and state-of-the-world information.

35. The system according to claim 34, wherein the system is a personal shopping assistant system providing the suggestions to the user.

36. The system according to claim 35, further comprising:
  a personal digital assistant device accepting commands from the user and providing a current state of the user to the personal shopping assistant system.

37. The system according to claim 34, wherein the user profile includes a static profile and a dynamic profile the dynamic profile including non-factual information.

38. The system according to claim 34, further comprising:
  a remote device which includes the output device and a fifth module transmitting the transactional information from the remote device to a central computing device, wherein the central computing device includes the first, second, third and fourth module and the storage device.

39. The system according to claim 34, further comprising:
  a remote unit which includes the first, second and third module, the storage device and the output device,
  wherein the fourth module is provided in a central computing device, the remote unit transmitting the user estimated needs information via a telecommunications arrangement to the central computing device, the central computing device transmitting the suggestions to the remote unit.

40. The system according to claim 34, further comprising;
  a remote device which includes a display arrangement providing the suggestions to the user.

41. The system according to claim 34, wherein the user profile includes a dynamic profile which is improved by compressing user dynamic rules to form user aggregated rules.

42. The system according to claim 34, wherein the user transacting history includes a user purchasing history.

* * * * *

UNITED STATES PATENT AND TRADEMARK OFFICE
CERTIFICATE OF CORRECTION

PATENT NO. : 6,236,978 B1
DATED : May 22, 2001
INVENTOR(S) : Tuzhilin

Page 1 of 2

It is certified that error appears in the above-identified patent and that said Letters Patent is hereby corrected as shown below:

<u>Title page,</u>
Item [56], References Cited, U.S PATENT DOCUMENTS, "5,727,120" should be deleted <u>Drawings,</u>
Figure 4, "SENTER" should read -- CENTER --

<u>Column 5,</u>
Form (1), "$A_{i2}\theta_{i2}b_{i2} \char`\^ C_{i1}\theta_{i1}a_{i1}$" should read -- $A_{i2}\theta_{i2}b_{i2} \char`\^ ... \char`\^ A_{ij}\theta_{ij}b_{ij} \char`\^ C_{i1}\theta_{i1}a_{i1}$ --

<u>Column 7,</u>
Form (4), "$A_{m\theta ijm}b_{ijm}$" should read -- $A_m\theta_{ijm}b_{ijm}$ --

<u>Column 8,</u>
Form (5), ""$A_{m\theta ijm}b_{ijm}$" should read -- $A_m\theta_{ijm}b_{ijm}$ --

<u>Column 9,</u>
Line 3, "C2" should read -- $C_2$ --
Line 4, "C3" should read -- $C_3$ --

<u>Column 11,</u>
Line 5, "Qucken" should read -- Quicken --

<u>Column 16,</u>
Line 27, "" should read -- --

UNITED STATES PATENT AND TRADEMARK OFFICE
CERTIFICATE OF CORRECTION

PATENT NO. : 6,236,978 B1
DATED : May 22, 2001
INVENTOR(S) : Tuzhilin

It is certified that error appears in the above-identified patent and that said Letters Patent is hereby corrected as shown below:

<u>Column 18,</u>
Line 2, "oft" should read -- of: --
Line 31, "profile the" should read -- profile, the --

Signed and Sealed this

Twenty-sixth Day of March, 2002

Attest:

JAMES E. ROGAN
*Attesting Officer*     *Director of the United States Patent and Trademark Office*

UNITED STATES PATENT AND TRADEMARK OFFICE
CERTIFICATE OF CORRECTION

PATENT NO. : 6,236,978 B1
DATED : May 22, 2001
INVENTOR(S) : Tuzhilin

It is certified that error appears in the above-identified patent and that said Letters Patent is hereby corrected as shown below:

Column 14,
Line 59, "static profiles" should read -- static profile --.

Signed and Sealed this

Eighteenth Day of April, 2006

JON W. DUDAS
*Director of the United States Patent and Trademark Office*